United States Patent [19]

Lütjens et al.

[11] Patent Number: 5,296,528

[45] Date of Patent: Mar. 22, 1994

[54] COMPATIBLE POLYMER BLENDS WITH THERMOPLASTIC POLYCARBONATES

[75] Inventors: Holger Lütjens, Köln; Karl-Erwin Piejko, Bergisch Gladbach; Rüdiger Plaetschke, Leverkusen; Christian Lindner, Köln; Jürgen Kirsch, Leverkusen, all of Fed. Rep. of Germany

[73] Assignee: Bayer Aktiengesellschaft, Leverkusen, Fed. Rep. of Germany

[21] Appl. No.: 922,898

[22] Filed: Jul. 31, 1992

[30] Foreign Application Priority Data

Aug. 9, 1991 [DE] Fed. Rep. of Germany ....... 4126422

[51] Int. Cl.$^5$ .................. C08L 29/10; C08L 69/00
[52] U.S. Cl. ...................... 524/513; 525/67
[58] Field of Search ................ 524/513; 525/67

[56] References Cited

U.S. PATENT DOCUMENTS

| | | | |
|---|---|---|---|
| 4,323,501 | 4/1982 | Eimers et al. | 260/333 |
| 4,444,950 | 4/1984 | Sakano et al. | 525/67 |
| 4,745,029 | 5/1988 | Kambour | 428/512 |
| 4,777,215 | 10/1988 | Wehnert et al. | 525/146 |
| 4,880,874 | 11/1989 | Hirai et al. | 525/67 |
| 4,885,335 | 12/1989 | Galluci et al. | 525/148 |
| 4,902,743 | 2/1990 | Boutni | 525/148 |
| 5,155,168 | 10/1992 | Lütjens et al. | 525/67 |

FOREIGN PATENT DOCUMENTS

| | | |
|---|---|---|
| 2510463 | 9/1976 | Fed. Rep. of Germany. |
| 3901030 | 7/1990 | Fed. Rep. of Germany. |
| 4000233 | 7/1991 | Fed. Rep. of Germany. |
| 1561890 | 12/1975 | United Kingdom. |

Primary Examiner—Paul R. Michl
Assistant Examiner—Edward Cain
Attorney, Agent, or Firm—Joseph C. Gil; Aron Preis

[57] ABSTRACT

A transparent thermoplastic molding composition containing:

A) 30 to 94% of a thermoplastic polycarbonates based on 2,2-bis-(4-hydroxyphenyl)-propane, and
B) 6 to 70% of a resin-like vinyl polymer which contains structural units corresponding to formula (Ia)

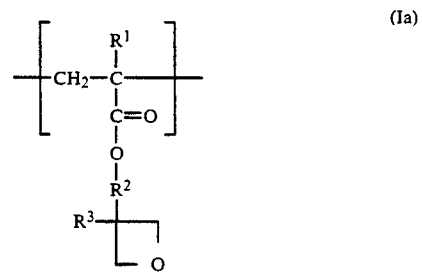

in which
$R^1$ is H or $CH_3$,
$R^2$ is $C_{1-4}$ alkylene and
$R^3$ is $C_{1-4}$ alkyl, is disclosed. The composition is particularly suitable for the preparation of optical storage media.

7 Claims, No Drawings

COMPATIBLE POLYMER BLENDS WITH THERMOPLASTIC POLYCARBONATES

FIELD OF THE INVENTION

The invention relates to thermoplastic molding compositions and more particularly, to compositions containing a polycarbonate resin and a vinyl polymer.

SUMMARY OF THE INVENTION

The invention relates to a transparent blend containing:

A) 30 to 94% of a thermoplastic polycarbonates based on 2,2-bis-(4-hydroxyphenyl)-propane, and
B) 6 to 70% of a resin-like vinyl polymer which contains structural units corresponding to formula (Ia)

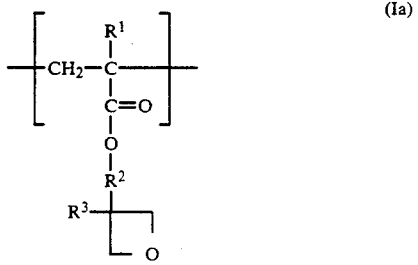

i which
$R^1$ is H or $CH_3$,
$R^2$ is $C_{1-4}$ alkylene and
$R^3$ is $C_{1-4}$ alkyl,
the sum total of the percentages by weight of components C) optionally standard additives and stabilizers. The thermoplastic composition of the invention is particularly suitable for the preparation of optical storage media.

DETAILED DESCRIPTION OF THE INVENTION

This invention relates to a transparent blend containing:

A) thermoplastic polycarbonates based on 2,2-bis-(4-hydroxyphenyl)-propane in quantities of 94% by weight to 30% by weight and preferably in quantities of 90% by weight to 40% by weight and
B) resin-like vinyl polymers containing structural units corresponding to formula (Ia)

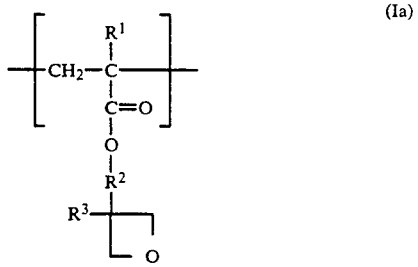

in which
$R^1$ is H or $CH_3$,
$R^2$ is $C_{1-4}$ alkylene and
$R^3$ is $C_{1-4}$ alkyl,
in quantities of 6% by weight to 70% by weight and preferably in quantities of 10% by weight to 60% by weight, the sum total of the percentages by weight of components A) + B) being 100, and C) optionally standard additives and stabilizers.

The components of the blend are miscible with one another with total compatibility (single phase) can be produced by melt compounding without separation of the individual components and are thermoplastically processable. Accordingly, they are suitable, for example, for the production of optical storage media. invention are easier to process and show reduced optical anisotropy. Compared with the pure vinyl polymers of component B) (see DE-OS 3,901,030, (Le A 26 529)), the mixtures according to the invention have improved heat resistance.

BACKGROUND OF THE INVENTION

EP 263 378 describes transparent blends of BPA polycarbonate and polymethyl methacrylate (PMMA) of which the production is dependent on special parameters, such as the molecular weight of the components, the process used to produce the PMMA, temperature, etc. In Abstracts of the 6th Annual Meetings, Polymer Processing Society, in Nizza (France), D. R. Paul et al. show that, in principle, blends of BPA polycarbonate and PMMA are only single-phase and transparent when produced from solution. The blends undergo phase separation on heating, as described by the lower critical solution temperature (LCST) which, in turn, is below the temperatures normally applied in the thermoplastic processing of BPA polycarbonate blends (T>220° C.). Accordingly, if BPA polycarbonate and PMMA are mixed in the melt (for example by melt compounding in mixing units, such as kneaders or extruders) only opaque phase-separated blends are obtained. If the individual components have the molecular weights relevant for industrial use, the blend cannot be thermoplastically processed without separation of its individual components.

The above-cited DE-OS 3,901,030 describes not only vinyl polymers containing oxetane groups, but also blends thereof with other thermoplastic polymers or with graft polymers. The use of such blends for the production of optical storage media is neither discussed in nor obvious from the DE-OS.

DE-OS 4,000,233 describes blends of polycarbonates, graft polymers and, optionally, thermoplastic vinyl polymers which contain 0.05 to 5% by weight structural elements (Ia) based on the overall effect. Due to the presence of the graft polymers, the blends are not transparent and are therefore unsuitable for optical storage media.

DE-OS 2,658,849 describes polycarbonates containing additions of polymeric oxetanes in quantities of 0.01% by weight to 5.0% by weight (claim 2 of the DE-OS) or 0.01% by weight to 0.50% by weight (page 6 of the DE-OS). However, the polymeric oxetanes have a different structure and are intended to improve the resistance of the polycarbonates to oxidation and hydrolysis.

In addition, it was known from DE-OS 2,510,463 that plastics can be stabilized by oxetane compounds in combination with phosphites.

The plastics used are of various types (page 7 of the DE-OS). Polycarbonates stabilized in this way are particularly suitable for use in the optical field (page 9 of the DE-OS). The stabilizer is used in a quantity of 0.01 to 1% by weight in admixture with phosphite.

In addition, it is known from DE-OS 2,255,639 that thermoplastic polycarbonates can be stabilized against thermal aging by phosphites containing oxetane groups. The phosphites are used in quantities of 0.01 to 0.2% by weight.

In our opinion, the subject of the present invention is also not obvious from the last three German Offenlegungsschrifts because structurally different oxetanes are incorporated in different quantities in the polycarbonates.

Thermoplastic polycarbonates based on 2,2-bis(4-hydroxyphenyl)-propane (bisphenol A) are those containing quantities of 100 mol-% to 55 mol-%, preferably 100 mol-% to 70 mol-% and, more preferably, 100 mol-% 2,2-bis-(4-hydroxyphenyl)-propane and complementary molar quantities of 45 mol-% to 0 mol-%, preferably 30 mol-% to 0 mol-% and, more preferably, 0 mol-% other diphenols than 2,2-bis-(4-hydroxyphenyl)-propane in uncondensed form, 1,1-bis-(4-hydroxyphenyl)cyclohexane and 1,1-bis-(4-hydroxyphenyl)-3,3,5-trimethyl cyclohexane being preferred.

The polycarbonates based on bisphenol A to be used in accordance with the invention (component A) have molecular weights Mw (weight average, as determined by gel chromatography after preliminary calibration) of 10,000 to 200,000 g/mol and preferably 12,000 to 100,000 g/mol.

The resin-like vinyl polymers used in accordance with the invention as component B) are prepared in accordance with DE-OS 3,901,030 from monomers corresponding to formula

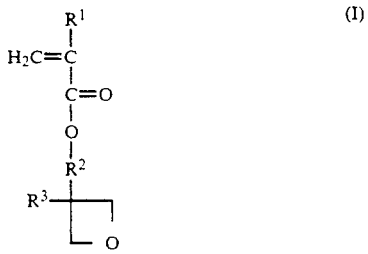

in which
R$^1$ is H, CH$_3$,
R$^2$ is C$_{1-4}$ alkylene,
R$^3$ is C$_{1-4}$ alkyl.

In a preferred embodiment,
R$^1$ is H or CH$_3$,
R$^2$ is —CH$_2$— and
R$^3$ is CH$_3$ or C$_2$H$_5$.

Up to 30% by weight, preferably up to 20% by weight and, more preferably, up to 10% by weight other vinyl monomers are. optionally copolymerized'. The structural units corresponding to formula (I) are thus present in the vinyl polymers of component B) in quantities of 100% by weight to 70% by weight, preferably in quantities of 100% by weight to 80% by weight, more preferably in quantities of 100% by weight to 90% by weight and, most preferably, in quantities of about 100%, by weight, based on the total weight of component B).

The other vinyl monomers are preferably aromatic vinyl compounds and acrylates and methacrylates other than those corresponding to formula (I) such as for example styrene. α-methyl styrene, acrylates, methacrylates, preferably styrene, α-methyl styrene, methyl methacrylate, cyclohexyl methacrylate and phenyl methacrylate.

In connection with component B) "resin-like" means that the polymers are uncrosslinked, have softening temperatures above 30° C. and are thermoplastically processable. The vinyl polymers may be produced from the monomers by known methods of polymerization, preferably in organic solvents or in aqueous suspension or emulsion by radical or thermal polymerization. The polymerization process applied must ensure that the oxetanyl groups remain intact (for example, strongly acidic (pH<1) and strongly alkaline (pH>12) media in conjunction with relatively high temperatures must be avoided in emulsion polymerization)

The molecular weight of the vinyl polymers may be influenced in the usual way through the polymerization temperature, the concentration of monomers, the quantity of catalyst and through molecular weight regulators, preferably organosulfur compounds, for example mercaptans or disulfides, more particularly long-chain mercaptans, such as n- and tert. dodecyl mercaptan. The regulators are normally dissolved in the monomer mixture.

The molecular weights Mw (weight average) of the vinyl polymers are preferably in the range from 3,000 to 800,000 g/mol and more preferably in the range from 10,000 to 500,000 g/mol (as determined by light scattering or sedimentation).

The monomers corresponding to formula (1) are known from the literature (see U.S. Pat. No. 3,105,838) and may be produced by methods known from the literature.

The replacement of bisphenol A by other bisphenols in the polycarbonate A) and the use of other vinyl monomers than those corresponding to formula (I) for the production of B) are critical. The effect of both variants can be that the mixtures of A) and B) are no longer compatible. The effect depends upon the type of the substituted units and their percentage content in the polymer, upon the composition of the other components according to the invention and also upon the mixing ratio of A) and B). In critical cases, therefore, the composition of components A) and B) has to be selected, optionally through reduction of the percentage content of the particular substituting monomers, so that a compatible (single-phase) blend is obtained by melt compounding. The presence of a compatible blend can be verified, for example, by determination of the glass temperature, for example by DSC measurements.

The blends according to the invention of A)+B) and, optionally, C) may also be produced by mixing of solutions of the individual components in a suitable solvent for components A), B) and, optionally, C) and subsequent precipitation or evaporation. Suitable solvents are in principle any solvents which dissolve components A) and B) more particularly methylene chloride and tetrahydrofuran.

In one preferred method of producing the polymer blends according to the invention, the polymers are mixed in the melt at temperatures above 200° C. and preferably at temperatures above 220° C. Mixing may be carried out in typical mixing units, such as mixing rolls, kneaders, single-screw or multiple-screw extruders.

Accordingly, the present invention also relates to a process for the production of the blends according to the invention of components A) and B) and, optionally, C), characterized in that either a) components A) and B)

and, optionally, C) are mixed via their solutions and the solution obtained is evaporated in known manner and the mixture is isolated or b) components A) and B) and, optionally, C) are mixed in the melt at temperatures above 200° C. and preferably at temperatures above 220° C. in standard mixing units and the resulting mixture is subsequently melt-compounded or melt-extruded.

The polymer blends are suitable for the production of moldings of all kinds by thermoplastic processing methods, such as extrusion or injection molding. The polymer blends may be used, for example, for the production of optical disks.

Accordingly, the present invention also relates to the use of the blends according to the invention of components A) and B) and, optionally, C) for the production of optical storage media, more particularly optical disks.

EXAMPLES

1. Starting compounds

Component A:

Bisphenol A polycarbonate prepared in accordance with DE 2,842,005; rel. solution viscosity $\eta rel = 1.20$ (as measured in methylene chloride at a concentration of 0.5 g/100 ml at 25° C).

Component B-1:

Homopolymer prepared by solution polymerization of the monomer corresponding to formula (II) in ethyl benzene

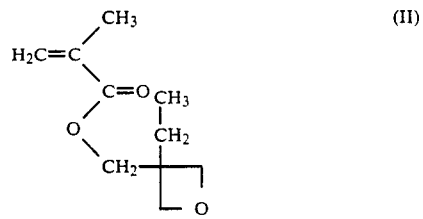

(II)

The polymer has an intrinsic viscosity of 0.20 dl/g (as measured in methylene chloride).

Component B-2:

Homopolymer prepared by aqueous emulsion polymerization of monomer (II) with the sodium salt of disproportionated abietic acid as emulsifier at pH 10. The polymer was precipitated by coagulation of the polymer latex with an aqueous magnesium sulfate/sodium acetate/acetic acid solution (pH 4.2) and working up in the usual way. The polymer has an intrinsic viscosity ($\eta$) of 1.24 dl/g.

2. Blends of component A and components B (invention)

Production method A:

Components A and B-1 are dissolved in methylene chloride in the ratio by weight shown in the Table. Films (500 μm, wet) are cast from the solution and dried in vacuo at 50° C. to constant weight.

Production method B:

Components A and B-1 or B-2 in the ratios by weight shown in the Table are mixed in a Haake kneader for 8 minutes at a temperature of 240° C. (rotational speed: 50 r.p.m.).

The mixtures prepared are investigated by differential calorimetry with heating to 250° C. The position of the glass transitions of the blends are shown in the Table.

TABLE

Glass transitions of the blends

| Examples | Composition in % by weight Components | | | Production method | Glass temperature in °C. |
|---|---|---|---|---|---|
| | A | B-1 | B-2 | | |
| 2.1 | 100 | — | — | — | 148 |
| 2.2 | — | 100 | — | — | 52 |
| 2.3 | 50 | 50 | — | A | 103 |
| 2.4 | 75 | 25 | — | B | 106 |
| 2.5 | 50 | — | 50 | B | 104 |
| 2.6 | 75 | — | 25 | B | 112 |

The blends of Examples 2.3 to 2.6 show only one glass transition and are therefore single phase blends. The BPA polycarbonate (component A) is fully compatible with the poly(oxetane methacrylate) (component B) irrespective of the molecular weight and production method of component B and the production method of the polymer blends (see Example 2.4 by comparison with 2.6 and Example 2.3 by comparison with 2.5).

The blends are also single-phase when produced via the melt (melt compounding), see Examples 2.4 to 2.6.

What is claimed is:

1. A transparent thermoplastic molding composition consisting of
   A) 90 to 40 percent of a thermoplastic polycarbonate based on 2,2-bis-(4-hydroxyphenyl)-propane and
   B) 10 to 60 percent of a resin-like vinyl polymer having a weight average molecular weight of 10,000 to 500,000 and which contains 100% by weight structural units corresponding to formula (Ia)

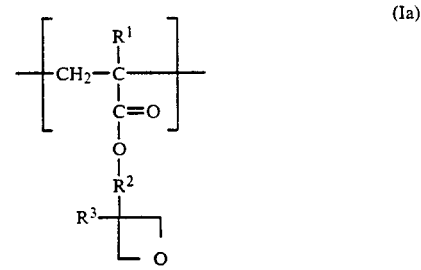

in which $R^1$ is H or $CH_3$, $R^2$ is $C_{1-4}$ alkylene, and $R^3$ is $C_{1-4}$ alkyl.

2. An optical storage medium comprising the composition of claim 1.

3. A transparent thermoplastic molding composition consisting of
   A) 90 to 40 percent of a thermoplastic polycarbonate based on 2,2-bis-(4-hydroxyphenyl)-propane and
   B) 10 to 60 percent of a resin-like vinyl polymer having a weight average molecular weight of 10,000 to 500,000 and which contains 70 to 100% by weight structural units corresponding to formula (Ia)

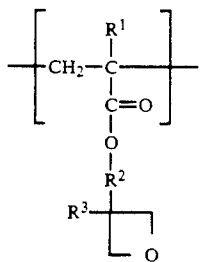
(Ia)

in which
R¹ is H or CH₃,
R² is C₁₋₄ alkylene, and
R³ is C₁₋₄ alkyl, and up to 30% by weight of structural units selected from the group consisting of styrene, alpha-methyl styrene and methacrylate, said percent being relative to the total weight of A) and B).

4. The composition of claim 3 further containing at least one additive selected from the group consisting of standard additives and stabilizers.

5. An optical storage medium comprising the composition of claim 3.

6. The composition of claim 3 wherein said resin-like vinyl polymer contains 80 to 100% of said structural units.

7. The composition of claim 3 wherein said resin-like vinyl polymer contains 90 to 100% of said structural units.

* * * * *